Perry & Manheim,

Manf. Hose.

No. 4,148. Reissued Oct. 4. 1870.

Witnesses:

Minnie Scheuck

John Rathey, Jr.

Inventors:

Edward L. Perry

Charles Manheim

N. PETERS, PHOTO-LITHOGRAPHER, WASHINGTON, D. C.

United States Patent Office.

EDWARD L. PERRY AND CHARLS MANHEIM, OF NEW YORK, N. Y., ASSIGNORS TO THE COMBINATION RUBBER COMPANY AND THE GUTTA-PERCHA AND RUBBER MANUFACTURING COMPANY.

Letters Patent No. 92,353, dated July 6, 1869; reissue No. 4,148, dated October 4, 1870.

IMPROVEMENT IN THE MANUFACTURE OF RUBBER OR GUTTA-PERCHA HOSE.

The Schedule referred to in these Letters Patent and making part of the same.

*To all whom it may concern:*

Be it known that we, EDWARD L. PERRY and CHARLS MANHEIM, of the city, county, and State of New York, have invented a new and useful Improvement in Rubber or Gutta-Percha Hose; and we do hereby declare that the following is a full, clear, and exact description thereof, which will enable others skilled in the art to make and use the same, reference being had to the accompanying drawing forming part of this specification.

The object of this invention is to provide rubber hose, so protected at the ends as to prevent the canvas from exposure to water or air, which, when so exposed, as it is now constructed, takes up the water by capillary attraction and retains it to such an extent that the ends of the hose soon become weak and rotten, and burst by the pressure of the water.

Figure 3 represents an end section under a modified arrangement.

Similar letters of reference indicate corresponding parts.

Figure 1:
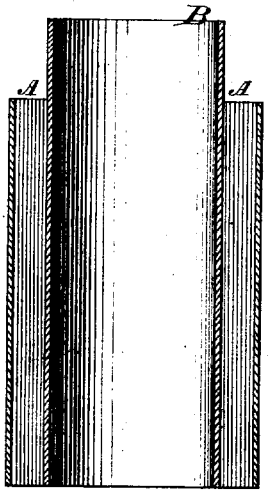
Figure 1 represents a section of an end, constructed according to our improvements.
Figure 5:
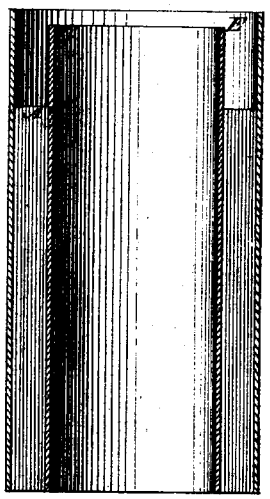
Figure 2:
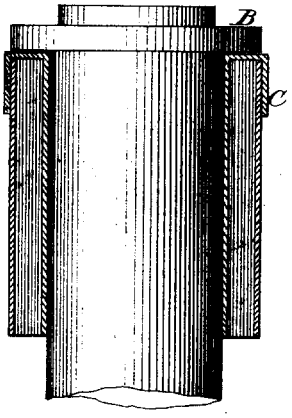
Figure 2 represents the same when the part B is folded over the part A so as to form a cap or seal to the same.
Figure 4:
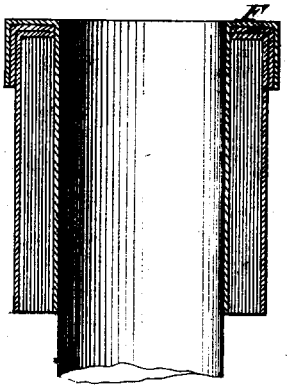
Figure 4 represents the same when folded so as to protect the ends of the canvas against the entrance of water.

In the present way of constructing India-rubber or gutta-percha hose, the edges of the canvas part are exposed to the air and water at the ends of the sections, where they are coupled together, as represented at A.

The result of this exposure is that so much water is taken up by capillary attraction of the canvas that the latter, for a considerable distance from the ends, is, in the case of hose used on fire-engines, nearly always wet. The condition of the canvas and rubber being very unfavorable for drying, owing to the continued presence of water in the canvas, it soon rots and loses its strength, and, consequently, the hose fails at the ends while the remaining portion is good.

Our invention consists in sealing up and closing the ends of the hose by means of a water-proof fabric, such as duck coated with rubber or gutta-percha, or other suitable water-proof material, so as to prevent entirely the entrance of water to the duck or fabric composing the body of the hose.

Any convenient mode of applying the water-proof fabric to the ends of the hose may be employed so as to secure the sealing of the ends against the entrance of water to the duck or canvas.

For fitting the part B-ends, we employ washers, with flat faces, fitting upon a mandrel, on which the hose is placed, and provided with means whereby they may be forced up snugly against the ends, as shown at D.

We propose, also, when desired, to extend the exterior rubber coating E in a similar manner, and first fold it down over the ends of the lining, as shown at F, and then folded back, together with the lining, over the exterior, thereby obtaining greater thickness of rubber at the ends.

Instead of extending the rubber lining or exterior coating, we may take a washer of rubber or gutta-percha and fit it up to the end of the hose on the mandrel in advance of the metallic washer, and hermetically cover the canvas by the union of said washer with the end of the hose.

By this plan, the canvas part of the hose is hermetically closed in from the air and water, and the exposure to rot entirely prevented.

We are aware that it is not new to seal up the ends of hose during vulcanization by covering the ends with rubber, or by cementing together the inner and outer plies of canvas, so as to prevent the entrance of water; but, as heretofore applied, the end thus formed had to be cut off before using the hose. By our mode of having the projecting fly B or two projecting plies, as shown in fig. 3, or by applying to the end a washer of rubber or gutta-percha, and thus providing for sealing the ends, as described, the hose, while in use, has its ends sealed up, and decay of the coupling prevented.

What we claim as new, and desire to secure by Letters Patent, is—

1. The mode herein described for protecting the ends of rubber or gutta-percha hose, the same consisting in inclosing the canvas part of the India-rubber or gutta-percha hose at the ends, either by folding over the said ends extensions of the lining, or extensions of the exterior covering, or by the application of rubber or gutta-percha washers, so as to cover the ends of duck or canvas, all substantially as specified.

2. The combination of a washer, of rubber or gutta-percha, with the ends of vulcanized hose, so as to protect the same, substantially as set forth.

3. As a new manufacture, vulcanized India-rubber hose provided with a rubber-coated covering over the ends of the duck or canvas, substantially as set forth.

The above specification of our invention signed by us this 14th and 17th days of September, 1870.

EDWARD L. PERRY.
CHARLS MANHEIM.

Witnesses as to CHARLS MANHEIM:
JOSEPH P. JOACHIMSEN,
JUNIUS SCHENCK.

Witnesses for EDW. L. PERRY:
EDWARD J. GREACEN,
JOHN RATHER, Jr.